(12) United States Patent
Greub et al.

(10) Patent No.: US 6,962,446 B2
(45) Date of Patent: Nov. 8, 2005

(54) METHOD FOR FABRICATING AN OPTICAL PLUG CONNECTOR, DEVICE FOR CARRYING OUT THE METHOD, AND PLUG CONNECTOR FOR USE IN SUCH A METHOD

(75) Inventors: Daniel Greub, Gallen (CH); Beat Koch, Waldstatt (CH); Igor Marjetic, Arnegg (CH); Paul Tanner, Schwellbrunn (CH); Martin Burkhard, Herisau (CH)

(73) Assignee: Huber & Suhner AG, Herisau (CH)

( * ) Notice: Subject to any disclaimer, the term of this patent is extended or adjusted under 35 U.S.C. 154(b) by 131 days.

(21) Appl. No.: 10/275,850

(22) PCT Filed: May 11, 2001

(86) PCT No.: PCT/CH01/00290

§ 371 (c)(1),
(2), (4) Date: Apr. 16, 2003

(87) PCT Pub. No.: WO01/95001

PCT Pub. Date: Dec. 13, 2001

(65) Prior Publication Data

US 2003/0165300 A1 Sep. 4, 2003

(30) Foreign Application Priority Data

Jun. 5, 2000 (CH) .............................................. 1106/00

(51) Int. Cl.⁷ ............................ G02B 6/36; G02B 6/25; G02B 6/00
(52) U.S. Cl. ......................... 385/80; 385/134; 385/139; 385/147
(58) Field of Search .............................. 385/80, 92, 94, 385/134, 137, 139, 147

(56) References Cited

U.S. PATENT DOCUMENTS

| 4,598,974 A | 7/1986 | Munn et al. |
| 4,679,895 A | 7/1987 | Huber |
| 4,877,303 A | 10/1989 | Caldwell et al. |
| 4,984,865 A | 1/1991 | Lee et al. |
| 5,131,063 A | 7/1992 | Monroe et al. |
| 5,757,997 A | 5/1998 | Birrell et al. |
| 6,491,444 B1 * | 12/2002 | Greub et al. .................. 385/80 |

FOREIGN PATENT DOCUMENTS

| EP | 0434212 A2 | 6/1991 |
| EP | 0486189 A2 | 5/1992 |
| GB | 2027924 A | 2/1980 |
| WO | WO 9904299 A1 | 1/1999 |
| WO | WO 0195001 A1 | 12/2001 |

* cited by examiner

*Primary Examiner*—Akm Enayet Ullah
*Assistant Examiner*—Omar Rojas
(74) *Attorney, Agent, or Firm*—Tarolli, Sundheim, Covel & Tummino L.L.P.

(57) ABSTRACT

The invention relates to a method for fabricating an optical plug connector, according to which the optical waveguide is immersed with the exposed optical fiber into a powdery adhesive and is withdrawn from the same, whereby particles of the powdery adhesive remain adhered to the surface of the fiber. The fiber with the adhered particles is then inserted into the bore of the ferrule of the plug connector and is fixed therein. The ferrule is heated to a temperature greater than or equal to the melting temperature of the adhesive and is maintained at this temperature. A particular suitability for use in the field is achieved by virtue of the fact that: the bonding of the fiber to the ferrule is carried out in a battery-operated hand-held device (130); the plug with the ferrule is inserted into and held on a receptacle (160) that is placed on the hand-held device (130); inside the receptacle (160), the ferrule is surrounded by a battery-operated electric heating element; the optical waveguide with the fiber is then inserted into the plug and is fixed inside the same by actuating means (129, 136, 137, 141, 143, 151) arranged inside the hand-held device (130), and; finally, the adherence is effected by heating the ferrule using the heating element.

36 Claims, 9 Drawing Sheets

METHOD FOR FABRICATING AN OPTICAL PLUG CONNECTOR, DEVICE FOR CARRYING OUT THE METHOD, AND PLUG CONNECTOR FOR USE IN SUCH A METHOD

TECHNICAL FIELD

The present invention relates to the field of fiber optics. It concerns a method for making up an optical plug-in connector according to the precharacterizing clause of claim 1.

Such a method is known, for example, from the applicant's publication WO-A1-99/04299.

The invention also relates to a device for carrying out such a method and to a plug-in connector for use in the case of such a method.

PRIOR ART

Optical waveguides are being used increasingly in a wide variety of application areas because of their great transmission capacity and bandwidth and their immunity to electromagnetic disturbances. In the case of networks with considerable local branching, as occur for example in building installations, the plug-in connections between various parts of the network are gaining ever greater significance, with the making-up of the connectors, i.e. the connection of the connectors to the respective cable, playing a special role.

Due to the change occurring in in-house applications, installation engineers are increasingly adopting the practice of making up optical-fiber connectors for multimode glass fibers directly in the field instead of splicing a prefabricated pigtail (i.e. a connector with a connected optical-fiber portion) onto the cable. This practice of making up directly in the field is, on the one hand, necessary due to the space conditions in the cable ducts and, on the other hand, also offers considerable cost advantages under certain preconditions on the basis of the installed connector.

In the case of making up an optical-fiber connector in the field, it is particularly evident that the processing costs significantly exceed the costs of the connectors themselves. In the case of conventional connectors, the time taken for making up in an assembly shop is about 4–6 minutes, while 15–20 minutes have to be allowed for making up in the field. There is correspondingly a ratio of the connector costs to the making-up costs of 1:(1–1.5) in the assembly shop as compared with 1:(4–5) for making up in the field. The different times required for making up in the field and in the assembly shop are largely explained by the greater influence of setting-up and waiting times when there are a small number of made-up connectors at each making-up location and also the adverse assembly conditions in the field. To provide a connector with the greatest possible competitive advantage, it is accordingly important to concentrate on the processing process.

In most countries outside the German-speaking region, optical-fiber connectors which belong to the infrastructure of a building are made up in the field. To accomplish this, sometimes sophisticated "field workshops" are set up, expensive special connectors are used, or a great amount of time is taken to make up the connectors under adverse assembly conditions.

In the German-speaking region, the method of splicing a prefabricated pigtail onto the cable currently still dominates. It has only been possible to sustain this relatively expensive method until now because it is relatively laborious to make up a connector directly on site. In addition to well-trained workers, splicing also requires a comparatively high investment in tools.

Communication cabling within buildings and works sites is generally performed in accordance with the standard for structured cabling of buildings EN 50 173 (TIA 568). This standard provides for a division into three zones (backbone, rising and horizontal zone). While in the past optical waveguides were often used only for the backbone zone, today optical waveguides are increasingly also being used for cabling the rising zone through to the horizontal cabling (FTTD). This decentralized use of optical waveguides is having the effect of reducing the number of optical-fiber connectors to be made up at each installation location, with the result that setting-up and waiting times are becoming more significant, sometimes drastically so. These circumstances will force the installation engineer in the future to revert increasingly to products which are optimized for making up in the field. The sometimes customary alternative involving splicing on of a pigtail likewise reaches its limits at the workplace, if not before, since there is too little space for making a splice at the communication socket. Furthermore, the standard currently prescribes the use of an SC or ST connector.

In particular in countries in which making up in the field is very significant, solutions which make allowance for the significance of the making-up time have already been put forward. However, these solutions generally entail one or more of the following disadvantages:
- adverse influencing of the performance capability or reliability
- cost-intensive basic principle
- proprietary standard
- only partial reduction of assembly time One of the known solutions is to use a plug-in connector pre-filled with a thermoplastic adhesive, which is simply heated during making up before the prepared optical waveguide is inserted (see for example U.S. Pat. No. 4,984,865).

With this type of making up, it is disadvantageous in particular that a comparatively large mass of material (adhesive and plug) has to be heated to relatively high temperatures (for example 204° C.), which requires a considerable amount of energy, which can only be provided with difficulty by battery-operated devices, with the result that a local mains power supply system is virtually indispensable.

Another known solution is referred to as the "crimp+polish" method (see for example U.S. Pat. No. 4,679,895).

In the case of this method, the optical waveguide is fixed in the connector without adhesive, the exposed fiber being located freely in the bore of a ferrule and polished at the free end. The advantage of the absence of adhesive bonding is offset here by the disadvantages that the guidance of the fiber is not definitely defined (the fiber "floats"), that the ferrule with the bore must be more accurate and consequently much more expensive, and that the polishing of the fiber is laborious and difficult.

A further known making-up method ("crimp+cleave"; see for example U.S. Pat. No. 5,131,063) has similar advantages and disadvantages to the aforementioned "crimp+polish" method, with the difference that, instead of the polishing, the fiber is broken. Although this dispenses with the laborious polishing operation, the optical values of the plug-in connection are far inferior.

A further known method ("fiber stub+mechanical splice"; see for example U.S. Pat. No. 4,877,303) uses a connector front part with an already inserted fiber portion ("fiber stub"), against the rear end of which the fiber end of the fiber-optic cable butts in a fixed manner in the connector. Although short assembly times can be achieved by this and there is no need for polishing, the additional connecting location results in increased reliability risks. In addition, the prefabricated front part is similarly expensive to a pigtail.

Another known method ("fiber stub+fusion splice"; see for example U.S. Pat. No. 4,598,974) works in a way similar to that mentioned above, with the difference that the fiber portion of the front part is welded to the fiber end of the fiber-optic cable. Here it is disadvantageous in particular that expensive tools are required, that a precision operation is required in the field, and that sometimes a mains power supply system is necessary.

Other methods, as are described for example in U.S. Pat. No. 5,757,997, may do entirely without ferrules, but require precision tools and do not conform to the standards for structured cabling of a building.

SUMMARY OF THE INVENTION

It is therefore an object of the invention to provide a method and a device for making up optical-fiber connectors which—in particular for the cabling of buildings—can be carried out or used easily, quickly and safely under the aggravated conditions of use in the field and do not require any expensive special tools, and also to provide a plug-in connector for use in the case of such a method.

The object is achieved by the features of claims 1, 12 and 23 in their entirety. On the basis of the type of adhesive bonding known from WO-A1-99/04299, the essence of the invention is to perform this adhesive bonding in a battery-operated hand-held device, the connector firstly being inserted with the connector pin into a receptacle attached to the hand-held device and held there, in which receptacle the connector pin is surrounded by a battery-operated electrical heating element, then the optical waveguide is inserted with the fiber into the connector and fixed in the connector by actuating means arranged in the hand-held device, and finally the adhesive bonding is carried out by heating up the connector pin with the heating element. The hand-held device can in this case simply be held in one hand, while the connector is inserted into the receptacle with the other hand and then the optical waveguide is inserted into the connector. Since the heating-up operation is restricted to the ferrule itself and the amount of adhesive is very small, it is possible to dispense entirely with mains operation.

A first preferred refinement of the method according to the invention is characterized in that, after insertion of the connector into the receptacle and before insertion of the optical waveguide into the connector, the connector pin is pre-heated by means of the heating element to a pre-heating temperature, that, after the insertion of the optical waveguide into the connector and fixing there, the connector pin is heated by means of the heating element up to a curing temperature, which is higher than the pre-heating temperature, and that the pre-heating phase is automatically ended if the heating-up to the curing temperature is not initiated within a predetermined time. As a result, reliable adhesive bonding is achieved and the use of electrical heating energy is restricted to a minimum.

A second preferred refinement of the method according to the invention is distinguished in that, after the adhesive bonding of the fiber to the connector pin, a buckling preventer which has been pushed over the optical waveguide before the optical waveguide is dipped into the adhesive is fastened at the rear end of the connector held in the hand-held device, that the buckling preventer is fastened by means of a nut which is arranged in the buckling preventer and is screwed with its internal thread onto a corresponding external thread at the rear end of the connector, that the internal thread and external thread are formed as conical round threads, that the optical waveguide has between an outer cladding and an inner buffered fiber a multiplicity of reinforcing fibers running in the longitudinal direction, and that the reinforcing fibers are clamped in between the internal thread and external thread when the buckling preventer is screwed on. This achieves strain relief in a simple way at the same time as attaching the buckling preventer.

The buckling preventer and the nut are preferably formed as separate parts which are positively connected to each other by torque-limiting connecting means. When the buckling preventer is screwed onto the connector, the nut is tightened until the torque limitation commences; then, the buckling preventer is pushed forward over the nut and reinforcing fibers hanging out to the front from the nut are drawn into an annular receiving space between the connector and the buckling preventer by turning the buckling preventer.

Preferably provided on the hand-held device under the receptacle is a slot through which the fiber of the optical waveguide which protrudes from the bore in the connector pin after the adhesive bonding is accessible from the outside. After the adhesive bonding, the protruding fiber is scored by inserting a scoring tool into the slot in the direct vicinity of the connector pin and is subsequently broken. For breaking the scored fiber, means preferably arranged underneath the slot in the hand-held device are pressed in the transverse direction against the protruding fiber. For reasons of environmental protection, it is particularly favorable in this case if the broken-off portion of the fiber is caught and collected in a fiber container arranged underneath the slot in the hand-held device.

The method according to the invention is further simplified if an adhesive cartridge with the powdered reaction adhesive, which is accessible from above through an opening and can be closed by a rotatable sleeve, is arranged on the hand-held device, and if the sleeve is turned into the opening position for the dipping of the exposed fiber into the adhesive and is turned back into the closed position after the drawing out of the fiber.

A preferred refinement of the device according to the invention is characterized in that the receptacle can be fitted onto the hand-held device, with appropriate contact sockets and contact pins being provided for the electrical connection of the heating element and a slot remaining free between the receptacle and the hand-held device for providing access from the outside to the connector pin inserted in the heating element, that the heating element comprises a cylindrical coil of a heating wire wound onto a sleeve, that the sleeve with the heating wire is arranged in the center of a spring plate in such a way that it can be deflected in the direction of the connector axis of the inserted connector, that the spring plate is formed as a printed circuit board and serves for the connection of the heating wire, and that the spring properties of the spring plate are produced by two concentric milled recesses in the printed circuit board, engaging spirally in each other. This achieves improved adaptation of the receptacle to the inserted connectors.

Another preferred refinement of the device according to the invention is distinguished by the fact that the adaptor is releasably connected to the receptacle, that the adaptor comprises two slides, which, lying opposite each other, are displaceable transversely in relation to the connector axis of the inserted connector, that the inserted connector can be held in a clamping manner between the two slides, and that the two slides can be arrested in the clamping position by means of an arresting slide which can be displaced transversely in relation to them.

A preferred refinement of the plug-in connector according to the invention is characterized in that latching means which latch the two parts to each other when the inner part is pushed into the sleeve for the clamping of a buffered fiber are provided on the inner part and on the sleeve.

Another preferred refinement is distinguished by the fact that a buckling preventer which can be attached to the rear end of the connector is provided, that the connector has a conical external thread for the attachment of the buckling preventer to the rear end, that a nut which has a corresponding conical internal thread, can be screwed with the buckling preventer onto the external thread and holds the buckling preventer on the connector is provided, that the external thread and internal thread are formed as round threads, and that means, in particular in the form of a tangentially oriented cutting plate, which prevent the nut from turning back on the external thread are arranged on the external thread.

The nut is preferably arranged releasably in a sleeve part formed onto the buckling preventer and, for positive connection with torque limitation between the nut and the buckling preventer, a knurling is respectively provided on the outer circumference of the nut and on the inner circumference of the sleeve part, which knurlings are in engagement with each other.

Further refinements emerge from the dependent claims.

BRIEF EXPLANATION OF THE FIGURES

The invention is to be explained in more detail below on the basis of exemplary embodiments in conjunction with the drawing, in which.

WAYS FOR IMPLEMENTING THE INVENTION

Figure 1:
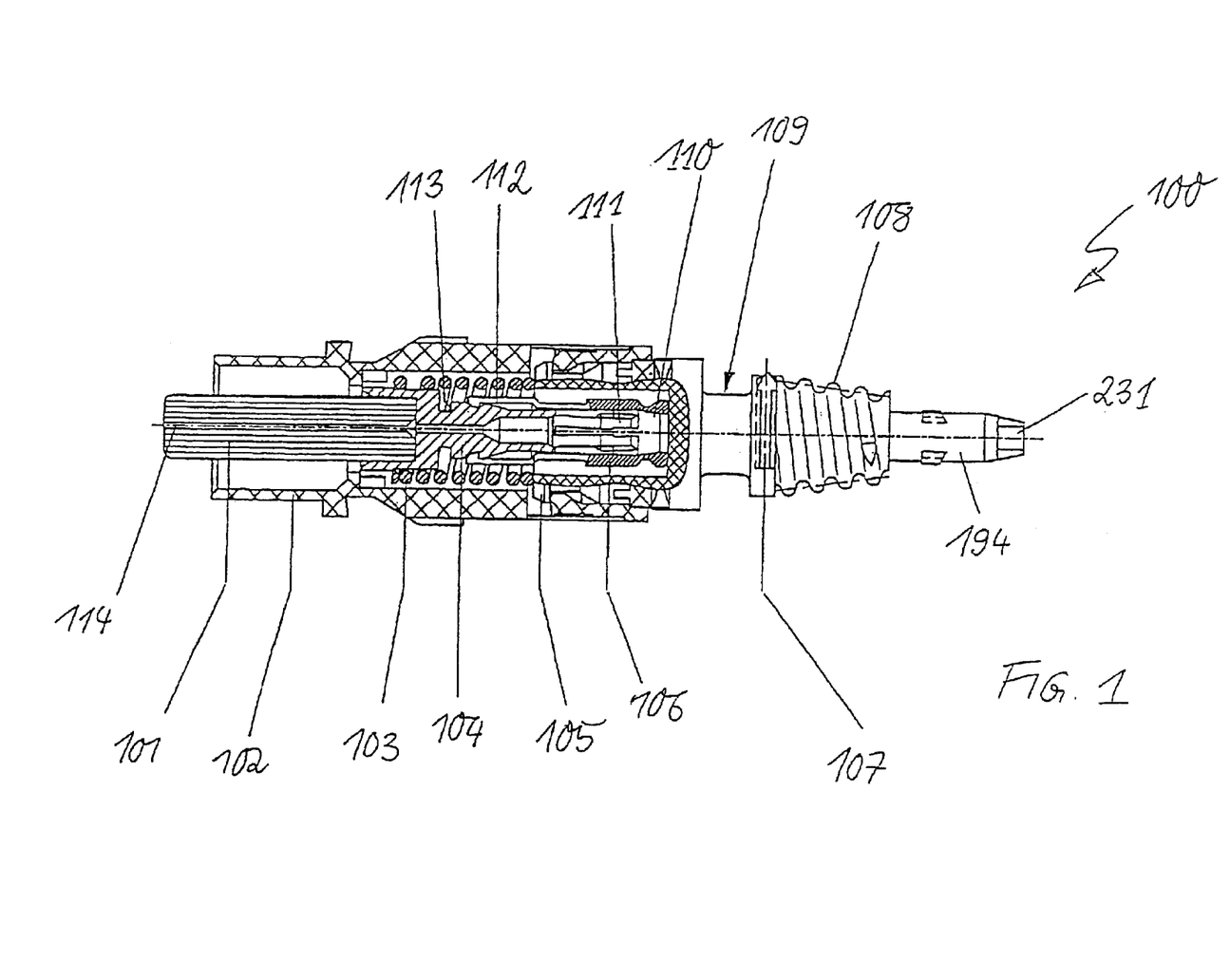
FIG. 1 shows a preferred exemplary embodiment of a connector according to the invention in a representation sectioned partly in the longitudinal direction.
Figures 2, 3, 4:
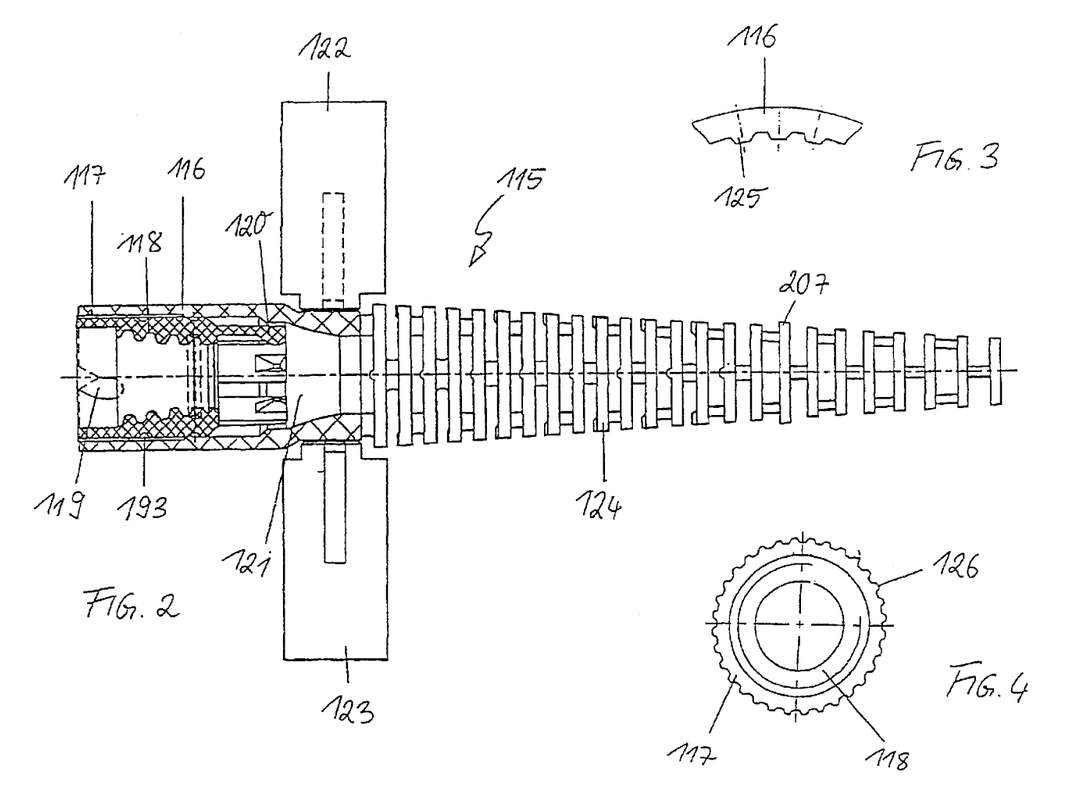
FIG. 2 shows a buckling preventer matching the connector according to FIG. 1 in a representation sectioned partly in the longitudinal direction.
FIG. 3 shows the plan view of the (inner) knurling in the buckling preventer from FIG. 2 in a detail.
FIG. 4 shows the plan view of the (outer) knurling of the nut arranged in the buckling preventer from FIG. 2.

The main parts of a plug-in connector according to a preferred exemplary embodiment of the invention are reproduced in FIGS. 1 and 2 in a representation partly sectioned in the longitudinal direction, FIG. 1 relating to a connector 100, and FIG. 2 relating to a buckling preventer 115 matching the connector 100. The plug-in connector 100, 115 is intended for an optical waveguide 200, which may have the form of a simple buffered fiber or take the form of a complete cable, the construction of which is shown by way of example in FIG. 13, and which has an inner fiber 205 of glass of an appropriate optical design. The fiber 205 is provided with a coating 204 and arranged in a buffered fiber 203. The buffered fiber 203 is for its part surrounded by an outer cladding 201. Running between the cladding 201 and the buffered fiber 203 in the longitudinal direction are a multiplicity of thin reinforcing fibers 202, which consist for example of aramid.

The connector 100 comprises an elongate outer housing 102. A strain relief 105 can be fitted into the housing 102 from the rear end in a latching manner. Outside the housing 102, the strain relief 105 goes over into a conical external thread 108, which is formed as a round thread. Provided between the external thread 108 and the part of the strain relief 105 fitted into the housing 102 is an annular constriction, which forms a receiving space 109 for the reinforcing fibers 202 of the optical waveguide 200. Formed on behind the external thread 108 is a tubular attachment 194, over which the cladding 201 of the optical waveguide 200 is pushed during the making-up of the plug-in connection. The insertion of the buffered fiber 203 into the attachment 194 is facilitated by a half-shell-shaped insertion groove 231, which is formed onto the free end of the attachment 194 as an insertion aid.

A connector pin (a ferrule) 101 is concentrically accommodated in the interior of the housing 102. The connector pin 101 consists of a precision ceramic and has a central bore 114, into which the optical waveguide 200 is inserted with the fiber 205 and adhesively bonded in place. The connector pin 101 is inserted or pressed into a corresponding recess at one end of an inner part 104 and held there. The inner part 104 is provided with a through-bore for leading through the optical waveguide 200. At the end remote from the connector pin 101, it runs out into a number of clamping arms 111, which annularly surround the buffered fiber 203 of an optical waveguide 200 led through. The inner part 104 extends with its clamping arms 111 into a concentrically arranged sleeve 106. The sleeve 106 has a conical narrowing 110, in which the clamping arms 111 are pressed together in a clamping manner when the inner part 104 is pushed from the position represented in FIG. 1 further to the right into the sleeve 106. The sleeve 106 for its part is provided at its end facing the connector pin 101 with latching arms 112, which latch in behind a latching edge 113 on the inner part when the inner part 104 is pushed far enough into the sleeve 106. In this way, the inner part 104 and the sleeve 106 are latched to each other in the position in which the clamping arms 111 hold an inserted buffered fiber 203 in a clamping manner.

The clamping operation described is brought about by the connector pin 101 being pressed axially into the housing 102 from the outside against the force of a compression spring 103. The compression spring 103 is supported with one end against the end face of the strain relief 105 and with the other end against a shoulder formed onto the inner part 104. When the sleeve 106 and the inner part 104 are latched to each other after completion of the clamping operation, the connector pin 101 can be moved back into the housing 102 in a freely resilient manner during the plugging-in operation.

A buckling preventer 115 can be releasably fastened to the connector 100 by means of the external thread 108 in a way according to FIG. 2. The buckling preventer 115 comprises a flexible buckling preventer grommet 124, which goes over at the front end into a sleeve part 116. Arranged concentrically in the interior of the hollow-cylindrical sleeve part 116 is a separate nut 117. The nut 117 has a conical internal thread 118, which matches the external thread 108 and is likewise formed as a round thread. The nut 117 has been fitted into the sleeve part 116 and is displaceable in the sleeve part 116 in the axial direction. The nut 117 is turned by turning of the sleeve part 116, with a positive connection being achieved between the two parts by two knurlings 125 and 126, which are in engagement with each other and, according to FIGS. 3 and 4, are respectively formed on the inner circumference of the sleeve part 116 and on the outer circumference of the nut 117. The knurlings 125, 126 are designed with the sloping flanks of their teeth in such a way that, on account of the compliant plastics material from which the two parts 116 and 117 are produced, they disengage whenever a certain torque is exceeded. A torque limitation which reliably prevents over-turning when the nut 117 is screwed onto the external thread 108 on the connector 100 is realized in this way. A cutting plate 107, oriented tangentially in the screwing-in direction, is also embedded on the external thread 108. The cutting plate 107 prevents turning-back of the nut 117 on the external thread 108.

The buckling preventer grommet 124 conically tapers outward. The inside diameter at the end of the buckling preventer grommet 124 is dimensioned in such a way that an optical waveguide in the form of a buffered fiber 203, i.e. without reinforcing fibers 202 and cladding 201, can be pushed through. If, on the other hand, a complete cable with reinforcing fibers 202 and cladding 201 is made up, the buckling preventer grommet 124 must be shortened correspondingly to increase the passing-through width. To make shortening easier, a marking ring 207, which is distinguished by an increased diameter and which indicates where the buckling preventer grommet 124 must be cut off in this case, is attached to the buckling preventer grommet 124.

To provide an adequate torque for the screwing-on of the nut 117, which is made more difficult when making up the plug-in connector by the reinforcing fibers 202 of the optical waveguide 200 clamped in between the external thread 108 and the nut 117, two wings 122, 123 are formed on the outer side of the buckling preventer 115, lying opposite each other, and can be removed after the screwing-on operation by breaking off at a predetermined breaking point. The predetermined breaking point is in this case produced directly on the buckling preventer 115 by forming a groove-shaped depression. Furthermore, clamping arms 120 are formed onto the rear end of the nut 117. If, after the screwing-on of the nut 117, the buckling preventer 115 is pushed with the sleeve part 116 forward over the nut 117, the clamping arms are pressed together in a clamping manner in a conical narrowing 121 in the sleeve part 116 and in this way fix the optical waveguide led through the buckling preventer 115. Here, too, the sleeve part 116 and the nut 117 are latched to each other in the clamping position by means of a latching groove 193 arranged on the outer circumference of the nut 117. When the buckling preventer 115 is being pushed over the nut 117, a pair of run-in slots 119 are exposed at the front end of the sleeve part 116. If, in this position, the buckling preventer 115 is turned in the correct rotational sense, the run-in slots 119 take up the reinforcing threads 202 hanging out between the nut 117 and the external thread 108 (FIG. 13) and wind them up in the receiving space 109. The portion of the sleeve part 116 pushed forward beyond the nut 117 then covers over the receiving space 109 filled with the reinforcing threads.

Figure 5:
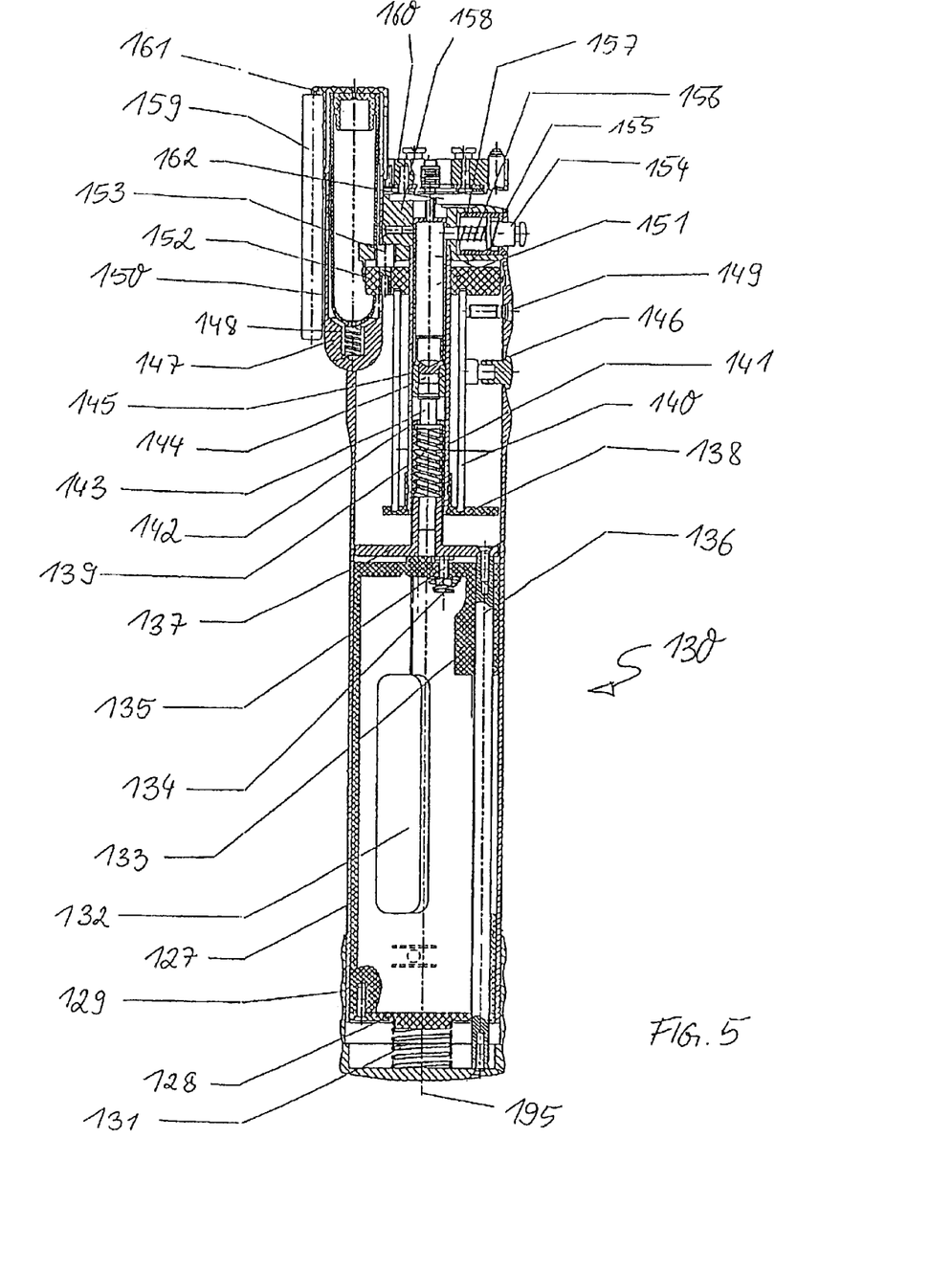
FIG. 5 shows a longitudinal section through a preferred exemplary embodiment of the hand-held device according to the invention.
Figure 6:
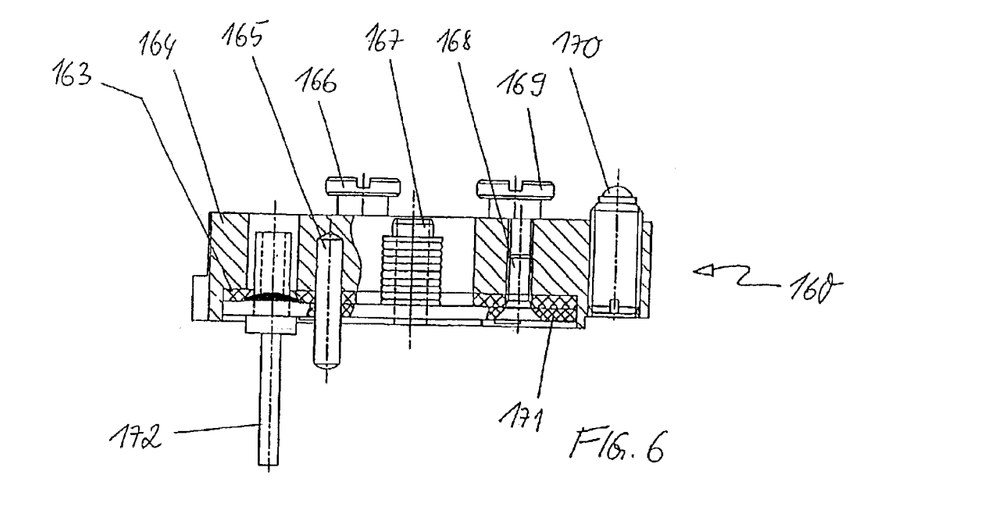
FIG. 6 shows an (enlarged) longitudinal section through the receptacle of the hand-held device from FIG. 5.
Figure 11:
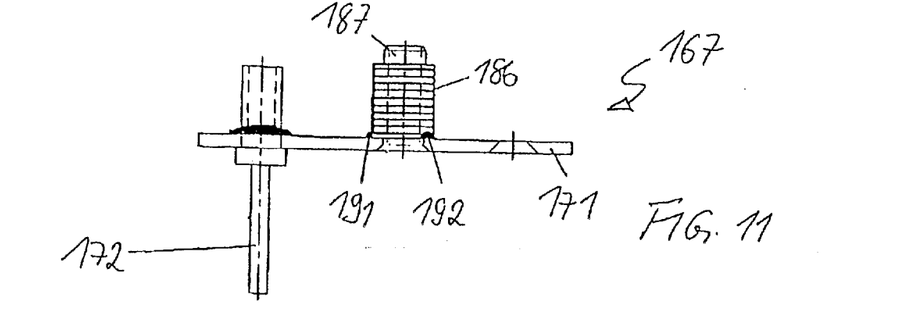
FIG. 11 shows a side view of the heating element from the receptacle of FIG. 6.
Figure 12:
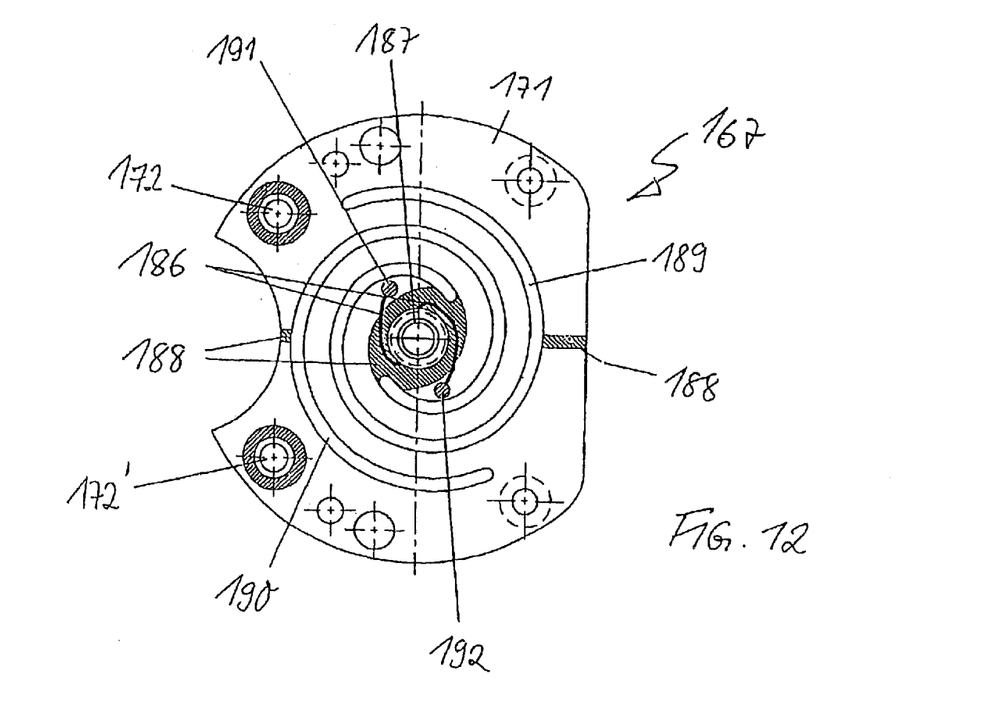
FIG. 12 shows the plan view from above of the receptacle according to FIG. 11.
Figure 13:
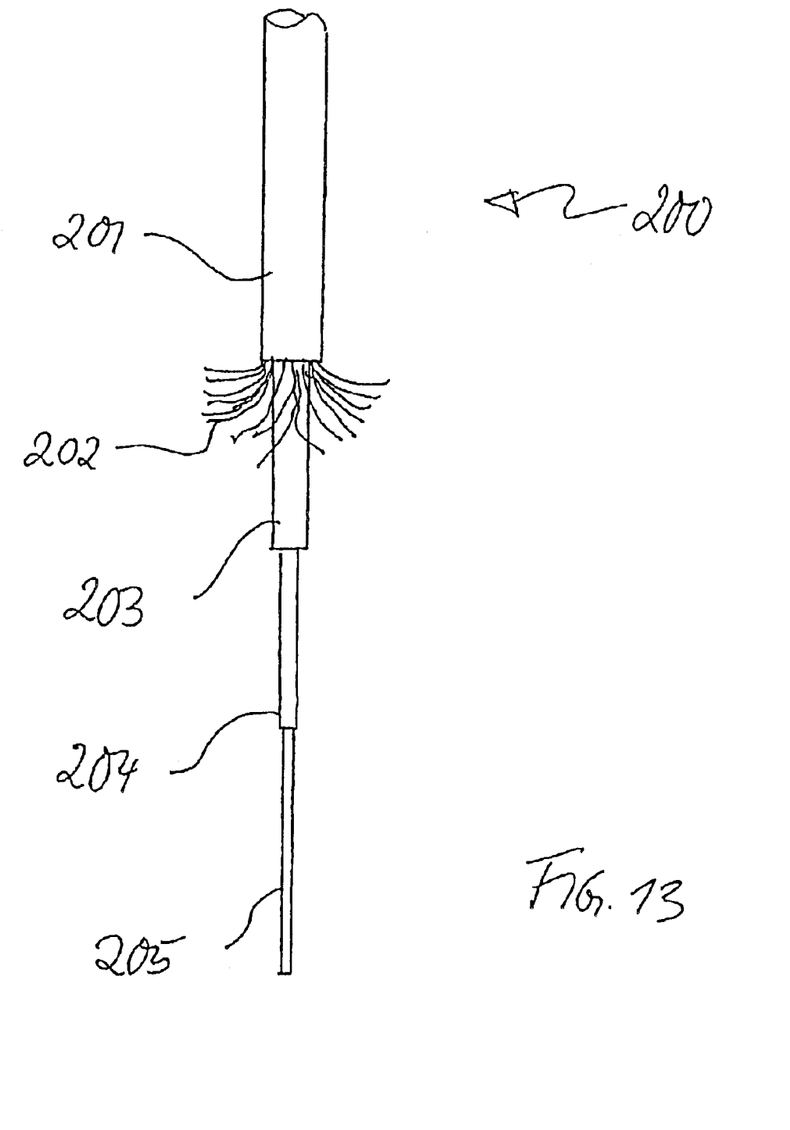
FIG. 13 shows the construction by way of example of an optical waveguide as used for the making-up according to the invention.

According to the invention, the making-up of the plug-in connection with the plug-in connector 100, 115 according to FIGS. 1 and 2 and the optical waveguide 200 according to FIG. 13 is carried out in the field by means of a compact hand-held device, as represented in a preferred exemplary embodiment in FIG. 5. The hand-held device 130, which can be grasped and held with one hand, has a tubular metal housing 127. Accommodated in the lower half of the housing 127 is a rechargeable battery pack 132, which is provided with a battery holder 133 and corresponding contact springs 134. The rechargeable battery pack 132 supplies the necessary energy for the electrical heating device used during the adhesive bonding of the fiber. The electrical connection is established by means of soldering lugs 135, which are attached to the upper end of the rechargeable battery pack 132. Underneath the rechargeable battery pack 132, the housing 127 is closed off in the downward direction by a base 128. In the upward direction, a disk-shaped body 158 forms the termination. Above the disk-shaped body 158, a receptacle 160 has been fitted into the hand-held device 130. The receptacle 160, which contains the heating element 167 necessary for the adhesive bonding, is represented separately and enlarged in FIG. 6 and is explained in more detail further below. The electrical connection of the receptacle 160 to the hand-held device 130 takes place via contact sockets 153 and corresponding contact pins 172, 172' on the receptacle 160 and the heating element 167, respectively (FIGS. 6, 11 and 12).

Accommodated in the space of the housing 127 which is located between the disk-shaped body 158 and the rechargeable battery pack 132 is the electronic control for the heating-up operation during making up. The control is arranged on two electronic boards 140, which are held vertically and parallel to each other between an upper insert 152 and a lower flange 138. Operator control of the control electronics is performed by means of an actuating knob 146 protruding outward from the housing 127. To indicate the respective operating state, three LEDs are arranged on one electronic board 140, the light of which is transmitted to the outside by light guides 149.

Arranged in the axis 195 of the hand-held device 130, between the receptacle 160 and the rechargeable battery pack 127, are actuating means, with which—as described further above—the connector pin 101 of a connector 100 inserted from above into the receptacle 160 and held there can be pressed into the housing 102 of the connector 100 by clamping of the buffered fiber 203. The actuating means comprise a bolt 143, which is mounted displaceably in the axial direction with its lower end in a flange 137 and bears at its upper end a sleeve 145, in the interior of which a magnet 144 is fastened. The bolt 143 is prestressed upward by a compression spring 139, supported against the flange 137, and is held on the flange 137 by a further sleeve 142. It can therefore move downward (spring deflection) in relation to the flange 137 against the pressure of the compression spring 139. Above the magnet 144, a cylindrical fiber container 151 is removably inserted with its metal base in the sleeve 145 provided there and is magnetically held. The fiber container 151 has at the upper end an upwardly open small tube which, when the fiber container 151 is pushed upward, acts directly on the connector pin 101 of the connector 100 inserted into the receptacle 160 and presses it upward. The fiber container 151 and the two sleeves 142, 145 slide in a tubular guide 141, which runs between the electronic boards 140 and is fastened with one end to the (fixed) flange 138 and with the other end to the disk-shaped body 158.

The fiber container 151 is displaced upward by pushing up the flange 137. The flange 137 itself is in this case actuated by means of a rod 136, which is guided downward laterally past the rechargeable battery pack 132 and is connected to a cup-shaped operating part 129, which has been slipped over the lower end of the housing 127 and prestressed by means of a compression spring 131 supported against the base 128. If the operating part 129 is pushed upward against the pressure of the compression spring 131, this movement is transferred via the rod 136, the flange 137, the compression spring 139 and the bolt 143 to the fiber container 151.

Figure 14:
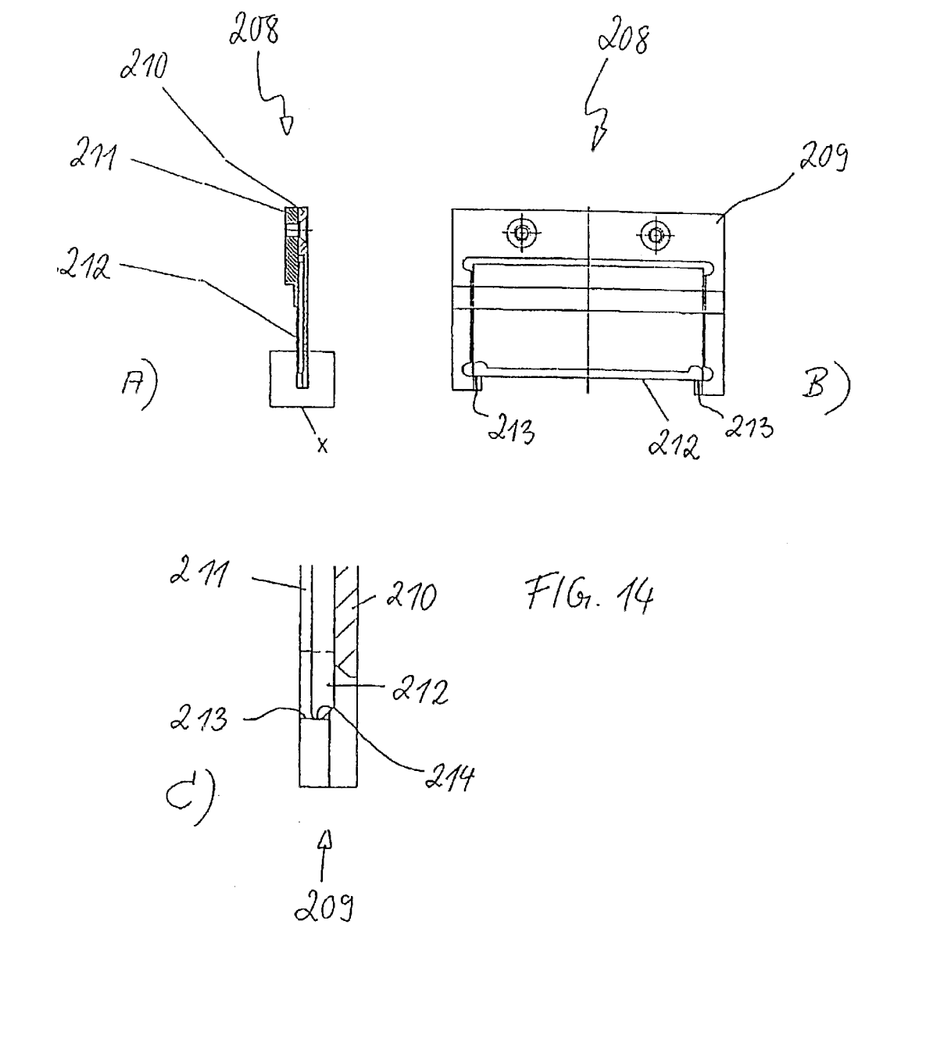
FIGS. 14A–C show a preferred exemplary embodiment of a scoring tool with a ceramic cutting blade, as can be advantageously used in conjunction with the hand-held device according to FIG. 5, in various sub-views, the sub-FIG. 14C showing the enlarged detail X from sub-FIG. 14A.

Protruding laterally into the fiber container 151 at the upper end through a corresponding slotted hole is a bolt 154 which can be operated from the outside. The bolt 154 is guided in a sleeve 157 embedded in the body 158 and can be pressed into the fiber container 151 against the pressure of a first compression spring 156 and can be pulled out of the fiber container 151 against the pressure of a second compression spring 155. The bolt 154 serves for breaking off a fiber 205 protruding downward out of the connector pin 101 after the adhesive bonding and at the same time secures the fiber container 151 against being pulled out of the hand-held device 130. The breaking-off is preceded by scoring of the fiber by means of a special scoring tool 208 (FIG. 14). The scoring tool 208 comprises a cutting blade 212 (of ceramic), which has a rounded cutting edge 214 (FIG. 14C) on the underside. The cutting blade 212 is mounted such that it can freely move vertically in a mount 209, which is screwed together from a front part 211 and a rear part 210. When the scoring tool 208 is not being used, the cutting blade 212 rests under its own weight with the cutting edge 214 on two ledges 213 attached laterally to the front part 211. When, on the other hand, the scoring tool 208 is moved with the mount 209 horizontally in a guided manner through a slot 162 left free in the hand-held device 130 between the receptacle 160 and the disk-shaped body 158, the cutting blade 212 lies freely on the fiber 205 to be scored and presses by its own weight with the cutting edge 214 onto the fiber. In this way, a defined scoring force is produced, permitting reliable and reproducible scoring of the fiber.

The powdered adhesive necessary for the adhesive bonding of the fiber 205 in the connector pin 101 is kept ready in an adhesive cartridge 150. The adhesive cartridge 150 is exchangeably accommodated in a tube 147 closed at the bottom and provided for this purpose on the hand-held device 130, and is prestressed upward by a compression spring 148. The fiber 205 can be inserted through a small opening in the cover of the adhesive cartridge 150 into the cartridge from above. The opening can be closed by a sleeve 161, the opening of which can be brought into line with the opening of the adhesive cartridge 150 by swiveling of the sleeve 161. The sleeve 161 can be swiveled in an easy way, by the thumb of the hand holding the hand-held device 130 acting on a pin 159 fastened vertically to the sleeve 161.

The receptacle 160, which can be fitted onto the hand-held device 130, is represented on its own once again in an enlarged form in FIG. 6. It comprises a disk-shaped body 164, into which four guides 166, 169 arranged in a rectangle, for guiding the adaptor 173 which can be fitted on (FIG. 9), have been adhesively bonded on the upper side. Likewise adhesively bonded in is a thrust piece 170, which serves for centering and fixing the fitted-on adaptor 173. Screwed onto the body 164 from the underside, by means of countersunk screws 168 and using a spacer 163 is the heating element 167 already mentioned above. The heating element 173 is shown on its own once again in FIGS. 11 and 12. The heating element 173 is constructed on a spring plate 171, which is simultaneously formed as a printed circuit board. The center of the spring plate 171 can spring perpendicularly out of the plane of the plate. This is achieved by two concentric milled recesses 189, 190 in the spring plate 171, which engage spirally in each other. The milled recesses 189, 190 and suitably arranged uncoated areas 188 (represented by shading in FIG. 12) at the same time define two separate (spiral) conductor tracks, which are used for the electrical connection of the heating wire 186, arranged in the center of the spring plate 171, to the two contact pins 172 and 172'. The connection of the heating wire 186 to the conductor tracks takes place by means of two soldering points 191, 192. The heating wire 186 of the heating element 167 is wound as a cylindrical coil onto a sleeve 187, into which the connector 100 which has been inserted into the hand-held device 130 enters with its connector pin 101. For this purpose, the sleeve 187 is arranged with the heating wire 186 in a through-opening in the body 164 of the receptacle 160 and is consequently accessible from above (FIG. 6).

Figure 7:
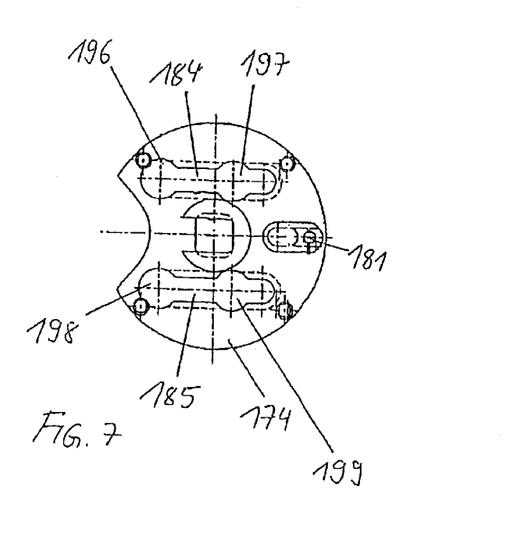
FIG. 7 shows a plan view of the underside of a preferred adaptor for securing the connector in the hand-held device according to FIG. 5.
Figure 8:
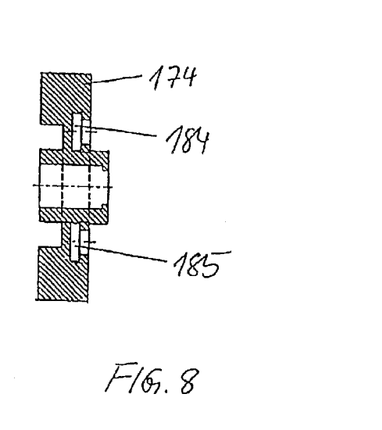
FIG. 8 shows a longitudinal section through the lower part of the adaptor from FIG. 7.
Figure 9:
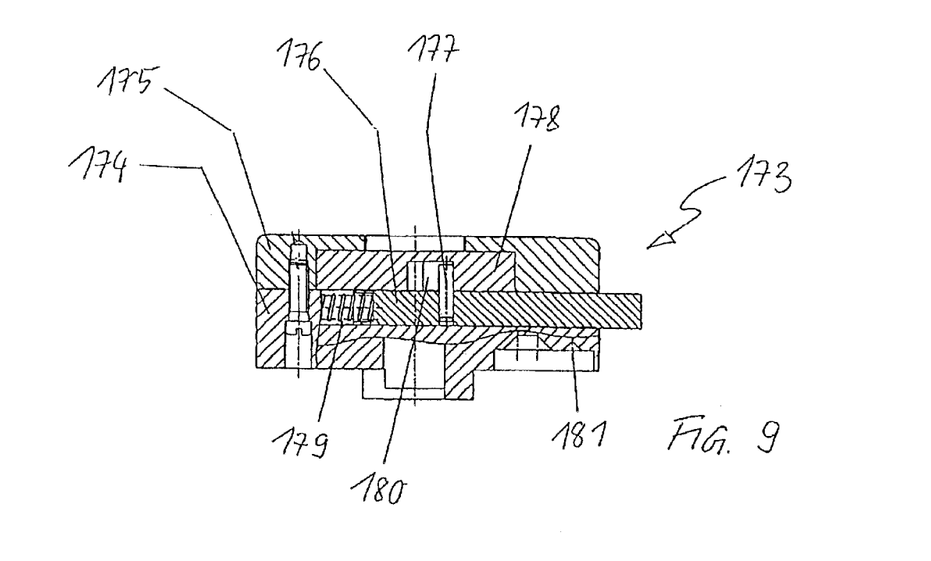
FIG. 9 shows a longitudinal section through the complete adaptor.

Downwardly protruding straight pins 165 are provided for the centering of the receptacle 160 on the hand-held device 130. An adaptor 173 is fitted onto the receptacle 160 from above according to FIGS. 7 to 10. The adaptor 173 is designed to match the respective type of the connector to be made up. The adaptor 173 comprises a disk-shaped upper part 175 and a disk-shaped lower part 174, which are screwed to each other (FIG. 9). According to FIGS. 7 and 8, the lower part 174 is provided with two sunken rails 184, 185 and a latching depression 181. For fastening the adaptor 173 to the receptacle 160, the adaptor 173 is fitted with the circularly widened openings 196, . . . , 199 of the rails 184, 185 over the heads of the guides 166, 169 and then displaced sideways, until the ball of the thrust piece 170 engages in the latching depression 181.

Figure 10:
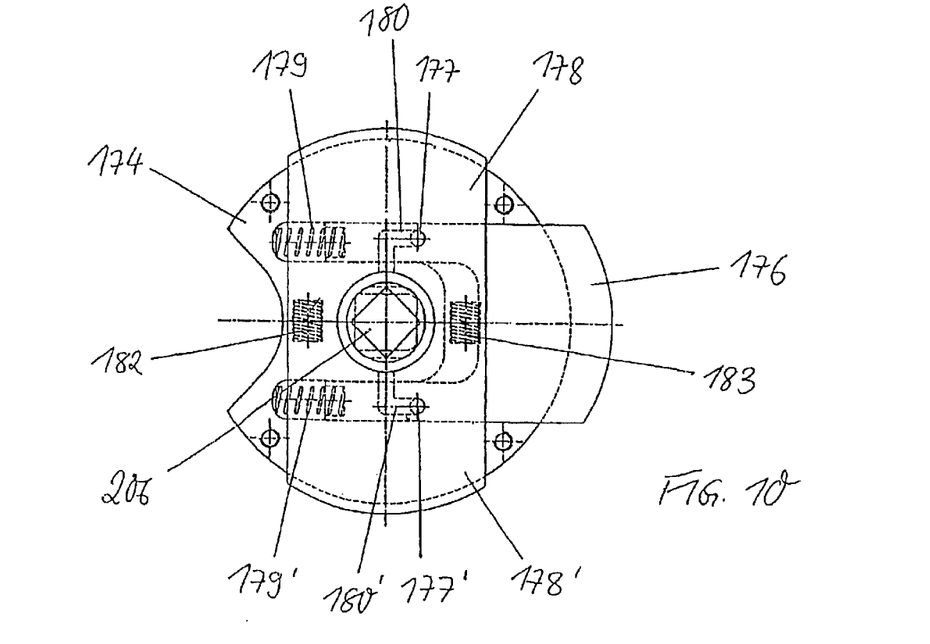
FIG. 10 shows a plan view from above of the lower part of the adaptor with the slides and the arresting slide.

The adaptor 173 serves for releasably holding the connector 100 which has been inserted into the hand-held device 130. For this purpose, it contains two slides 178, 178', which are displaceable with respect to each other and are arranged between the upper part 175 and lower part 174 (FIG. 10). In the pushed-together state, the slides 178, 178' form a square opening 206, in which the connector 100 is held by its housing 102 in a pincer-like manner (secured against twisting and in all directions). The slides 178, 178' are prestressed in the opening direction by two compression springs 182, 183 and can be arrested in the closed position—as shown in FIG. 10—by a transversely displaceable arresting slide 176. The arresting slide 176 has for this purpose two perpendicular straight pins 177, 177', which are in engagement with assigned slotted guides 180, 180', bent away at right angles, in the slides 178, 178'. If the arresting slide 176 is displaced to the left from the position represented in FIG. 10 against the force of two compression springs 179, 179', until the straight pins 177, 177' reach the corner point of the slotted guides 180, 180', the slides 178, 178' are pressed by the compression springs 182, 183 outward into the opening position and release the held connector 100. Conversely, for holding a connector 100, firstly the slides 178, 178 have to be pushed together by hand from the outside, until the arresting slide 176 is pressed to the right in an arresting manner by the compression springs 179, 179'.

The overall (step-by-step) sequence for making up, with the devices represented in the figures, can consequently be described by way of example as follows:

(1) Prepare hand-held device 130
  (a) Switch on hand-held device 130
    keep the actuating knob 146 depressed for about 5 s
    the right-hand LED of the three LEDs flashes green (online mode)
  (b) Plug in connector 100
    plug the connector 100 into the adaptor 173 and align it
    press in slides 178, 178' until arresting slide 176 jumps out (slides 178, 178' are then arrested)
(2) Prepare optical waveguide 200
  (a) Remove cladding 201
    use stripping tongs to remove cladding to a length of about 45 mm
    this operation is not needed in the case of buffered fibers
  (b) Shorten buckling preventer 115
    break off buckling preventer grommet 124 at a marking, or cut off with stripper
    this operation is not used in the case of buffered fibers
  (c) place buckling preventer 115 on optical waveguide 200
    push buckling preventer onto the optical waveguide 200 to the extent that that the exposed reinforcing fibers 202 remain peeled back
  (d) Remove buffered fiber 203 and coating 204
    use the coating tongs to expose the fiber 205 to a length of about 20 mm
(3) Making up
  (a) Preheat hand-held device 130
    hold actuating knob 146 depressed for about 1 s
    a bleep sounds at the start of the pre-heating phase, the left-hand LED of the three LEDs lights up red (→ from this time, the fiber 205 can be dipped in the adhesive)
    a bleep sounds when the pre-heating temperature is reached, the left-hand LED flashes red/green (→ from this time, the fiber 205 can be inserted into the connector 100)
    a double bleep sounds when the finishing heating process can be initiated, the left-hand LED lights up green (→ up to this point in time, the steps up to and including "clamp buffered fiber" (see below) must have been completed; should this not be the case, the hand-held device 130 goes back into the online mode after 15 s)
  (b) dip fiber 205 in the adhesive
    turn sleeve (cover) 161 aside and dip fiber 205 in the adhesive in the adhesive cartridge 150, so that the fiber 205 is wetted up to the buffered fiber 203
  (c) insert fiber 205 into connector 100
    carefully insert fiber 205 into the connector 100
  (d) clamp buffered fiber 203
    by pressing in the operating part 129 under the hand-held device 130, clamp the buffered fiber 203 in the connector 100
  (e) Finishing heating
    briefly depress actuating knob 146
    a bleep sounds at the start of the finishing heating phase, the middle LED lights up red (→ during this time, the system must be left alone)
    a bleep sounds as soon as the curing temperature is reached; the middle LED flashes red/green (→ from this point in time, the finishing steps for making up the connector may be completed)
    a bleep sounds as soon as the curing time is reached; the left-hand and middle LEDs light up green (→ from this point in time, the connector 100 may be unclamped if all the making-up steps have been carried out)
  (f) tighten reinforcing fibers 202 (aramid)
    pull back buckling preventer 115, so that aramid is exposed
    after that, screw the buckling preventer 115 (clockwise) onto the connector 100, until the torque limitation (knurlings 125, 126) turns freely; the aramid is consequently firmly clamped between the concentric round threads 108, 118 of the strain relief 105 and buckling preventer 115; the nut 117 is secured against unscrewing by the integrated cutting plate 107 (g) pull in aramid (202)
    press buckling preventer 115 forward and draw in aramid by turning movement (clockwise); because of the turning movement, the aramid is automatically taken up by the run-in slots 119 and stowed in the freed receiving space 109 at the strain relief 105; the buckling preventer 115 is secured in its position by latching means between the nut 117 and the buckling preventer 115
  (h) score fiber 205
    carefully pull the ceramic blade through the slot 162 on the hand-held device 130; ensure that the faceted side, facing downward, enters the slot 162
  (i) break fiber 205
    by pressing the bolt 154 right under the slot 162, break the fiber 205
  (j) take connector 100 out of hand-held device 130
    by pressing the arresting slide 176, the arrestment is released, the slides 178, 178' move out
(4) Finishing
  (a) Mark connector pin (ferrule) 101
    press ferrule 101 into a (colored) felt adaptor as far as it will go (little force) (marking)
  (b) rub down connector 100
    using a first abrasive cloth, rub down until marking is scarcely visible (the end face of the ferrule serves here as a guide for the rubbing process, without itself being changed)
  (c) polish connector 100
    using a second abrasive cloth, polish until the end face is clean (the end face of the ferrule serves here as a guide for the polishing process, without itself being changed)

The method described and the associated hand-held device 130 are designed for use in the field. To ensure optimum availability and handling and at the same time that all equipment and accessories are safely kept, it is of advantage to use a tool box 215 according to FIGS. 15 and 16. The tool box 215 comprises a body 216 made of Styropor or the like bent in a kidney-shaped manner in cross section, which can be carried in front of the stomach by means of a carrying strap (not represented). Provided in the body 216 symmetrically in relation to a center plane 217 (for left-handed and right-handed people) are variously shaped recesses 218, . . . , 223, which serve for receiving the equipment. The central round recess 218, for example, receives the hand-held device 130. In a further round recess 219, the felt adaptor for marking during the rubbing-down and polishing process is accommodated. Two long slot-shaped recesses 221, 222 receive the abrasive cloths, while the scoring tool 208 is stored in a short slot-shaped recess 223. The stripping tongs necessary for preparing the optical waveguide 200 can be fitted into the rectangular recess 220.

Figure 15:
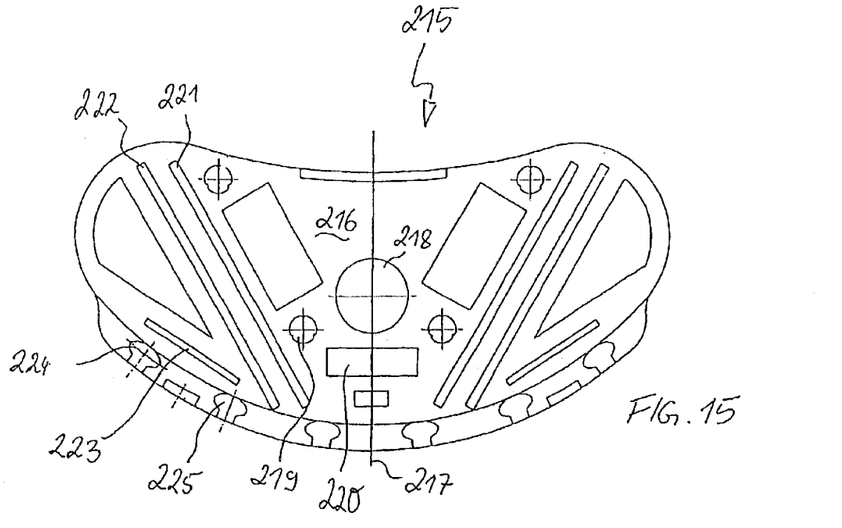
FIG. 15 shows in the plan view from above a preferred exemplary embodiment of a tool box, in which the tools and the other accessories for carrying out the method according to the invention can be safely accommodated with easy access.
Figure 16:
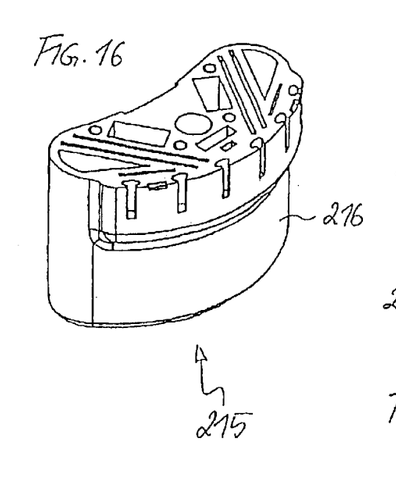
FIG. 16 shows a perspective view of the tool box according to FIG. 15.
Figure 17:
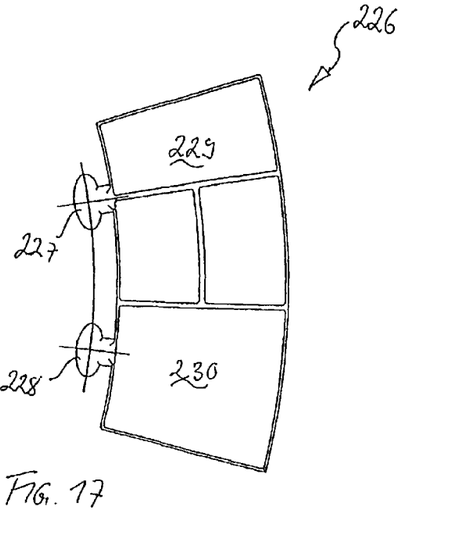
FIG. 17 shows in the plan view from above a packaging container for small parts, which can be releasably connected to the tool box from FIG. 15.

Provided for the consumable materials, such as for example the individual parts of the plug-in connector, is a separate packaging container 226, which is subdivided into a number of compartments 229, 230 (FIG. 17), can be releasably and exchangeably pushed by means of two (vertical) holding rails 227, 228 into corresponding holding grooves 224, 225 on the front side of the tool box 215 and, as a result, can be captively connected to the tool box 215. In this way, the person entrusted with making up keeps all the necessary materials and equipment ready to hand at any time and at the same time safely.

Altogether, the invention provides a method of making up optical plug-in connectors which is easy, reliable, quick, inexpensive and can be used particularly well in the field. All devices and tools necessary for this purpose can be accommodated compactly in a tool box. Each tool only has to be taken out once and should be stored again in the tool box after the process steps have been appropriately carried out.

List of Designations

| | |
|---|---|
| 100 | connector |
| 101 | connector pin (ferrule) |
| 102 | housing |
| 103 | compression spring |
| 104 | inner part |
| 105 | strain relief |
| 106 | sleeve |
| 107 | cutting plate |
| 108 | external thread (conical) |
| 109 | receiving space (annular) |
| 110 | narrowing (conical) |
| 111 | clamping arm |
| 112 | latching arm |
| 113 | latching edge |
| 114 | bore |
| 115 | buckling preventer |
| 116 | sleeve part |
| 117 | nut |
| 118 | internal thread (conical) |
| 119 | run-in slot |
| 120 | clamping arm |
| 121 | narrowing (conical) |
| 122, 123 | wing |
| 124 | buckling preventer grommet |
| 125, 126 | knurlings |
| 127 | housing (tubular) |
| 128 | base |
| 129 | operating part (cup-shaped) |
| 130 | hand-held device |
| 131, 139, 148 | compression spring |
| 132 | rechargeable battery pack |
| 133 | battery holder |
| 134 | contact spring |
| 135 | soldering lug |
| 136 | rod |
| 137, 138 | flange |
| 140 | electronic board |
| 141 | guide |
| 142, 145 | sleeve |
| 143 | bolt |
| 144 | magnet |
| 146 | actuating knob |
| 147 | tube |
| 149 | light guide |
| 150 | adhesive cartridge |
| 151 | fiber container |
| 152 | insert |
| 153 | contact socket |
| 154 | bolt |
| 155, 156 | compression spring |
| 157 | sleeve |
| 158 | body |
| 159 | pin |
| 160 | receptacle |
| 161 | sleeve |
| 162 | slot |
| 163 | spacer |
| 164 | body |
| 165 | straight pin |
| 166, 169 | guide element |
| 167 | heating element |
| 168 | countersunk screw |
| 170 | thrust piece |
| 171 | spring plate |
| 172, 172' | contact pin |
| 173 | adaptor |
| 174 | lower part |
| 175 | upper part |
| 176 | arresting slide |
| 177, 177' | straight pin |
| 178, 178' | slide |
| 179, 179' | compression spring |
| 180, 180' | slotted guide |
| 181 | latching depression |
| 182, 183 | compression spring |
| 184, 185 | rail |
| 186 | heating wire |
| 187 | sleeve |
| 188 | uncoated area |
| 189, 190 | milled recess |
| 191, 192 | soldering point |
| 193 | latching groove |
| 194 | attachment (tubular) |
| 195 | axis |
| 196, . . . , 199, 206 | opening |
| 200 | optical waveguide |
| 201 | cladding |
| 202 | reinforcing fiber (aramid) |
| 203 | buffered fiber |
| 204 | coating |
| 205 | fiber |
| 207 | marking ring |
| 208 | scoring tool |
| 209 | mount |
| 210 | rear part |
| 211 | front part |
| 212 | cutting blade (ceramic) |
| 213 | ledge |
| 214 | cutting edge (rounded) |
| 215 | tool box |
| 216 | body (for example made of Styropor) |
| 217 | center plane |
| 218, . . . , 223 | recess |
| 224, 225 | holding grooves |
| 226 | packaging container |
| 227, 228 | holding rail |
| 229, 230 | compartment |
| 231 | insertion groove |

What is claimed is:

1. A method for making up an optical plug-in connector, which comprises a connector (100) with a connector pin (101), and an optical waveguide 200 with a light-guiding fiber (205), in which method the light-guiding fiber (205) of said optical waveguide (200) is exposed, inserted into a bore (114) in the connector pin (101) and fixed in the bore (114) by adhesive bonding with a powdered reaction adhesive, which is transformed into the liquid state by melting and, in the liquid state, is made to react and crosslinks to form a temperature-resistant bond, and in which method the optical waveguide (200) with the exposed light-guiding fiber (205) is dipped in the powdered adhesive and then pulled out particles of the powdered adhesive remaining adhering to the surface of the fiber (205), the fiber (205) with the adhering particles is inserted into the bore (114) of the connector pin (101) and fixed there, and the connector pin (101) is brought to and held at a temperature which is greater than or equal to the melting temperature of the adhesive, characterized in that the adhesive bonding of the fiber (205) to the connector pin (101) is performed in a battery-operated hand-held device (130), in that firstly the connector (100) is inserted with the connector pin (101) into a receptacle (160) attached to the hand-held device (130) and is held there, in which receptacle (160) the connector pin (101) is surrounded by a battery-operated electrical heating element (167), in that the optical waveguide (200) is then inserted with the fiber (205) into the connector (100) and fixed in the connector (100) by means of actuating means (129, 136, 137, 141, 143, 151) arranged in the hand-held device (130), and in that finally the adhesive bonding is carried out by heating up the connector pin (101) with the heating element (167).

2. The method as claimed in claim 1, characterized in that, after insertion of the connector (100) into the receptacle (160) and before insertion of the optical waveguide (200) into the connector (100), the connector pin (101) is pre-heated by means of the heating element (167) to a pre-heating temperature, and in that, after the insertion of the optical waveguide (200) into the connector (100) and fixing there, the connector pin (101) is heated by means of the heating element (167) up to a curing temperature, which is higher than the pre-heating temperature.

3. The method as claimed in claim 2, characterized in that the pre-heating phase is automatically ended if the heating-up to the curing temperature is not initiated within a predetermined time.

4. The method as claimed in claim 1, characterized in that, after the adhesive bonding of the fiber (205) to the connector pin (101), a buckling preventer (115) which has been pushed over the optical waveguide (200) before the optical waveguide (200) is dipped into the adhesive is fastened at the rear end of the connector (100) held in the hand-held device (130).

5. The method as claimed in claim 4, characterized in that the buckling preventer (115) is fastened by means of a nut (117) which is arranged in the buckling preventer (115) and is screwed with its internal thread (118) onto a corresponding external thread (108) at the rear end of the connector (100).

6. The method as claimed in claim 5, characterized in that the internal thread (118) and external thread (108) are formed as conical round threads, in that the optical waveguide (200) has between an outer cladding (201) and an inner buffered fiber (203) a multiplicity of reinforcing fibers (202) running in the longitudinal direction, and in that the reinforcing fibers (202) are clamped in between the internal thread (118) and external thread (108) when the buckling preventer (115) is screwed on.

7. The method as claimed in claim 6, characterized in that the buckling preventer (115) and the nut (117) are formed as separate parts which are positively connected to each other by torque-limiting connecting means (125, 126), in that, when the buckling preventer (115) is screwed onto the connector (100), the nut (117) is tightened until the torque limitation commences, and in that, then, the buckling preventer (115) is pushed forward over the nut (117) and reinforcing fibers (202) hanging out to the front from the nut (117) are drawn into an annular receiving space (109) between the connector (100) and the buckling preventer (115) by turning the buckling preventer (115).

8. The method as claimed in claim 1, characterized in that, provided on the hand-held device (130) under the receptacle (160) is a slot (162) through which the fiber (205) of the optical waveguide (200) which protrudes from the bore (114) in the connector pin (101) after the adhesive bonding is accessible from the outside, and in that, after the adhesive bonding, the protruding fiber is scored by inserting a scoring tool (208) into the slot (162) in the direct vicinity of the connector pin (101) and is subsequently broken.

9. The method as claimed in claim 8, characterized in that a scoring tool (208) is used, in which a cutting blade (212) provided with a cutting edge (214) is mounted such that it is freely displaceable in the vertical direction in a mount (209), and in that the scoring tool (208) is drawn with the mount (209) transversely in relation to the fiber (205) in a guided manner through the slot (162) in such a way that the cutting blade (212) presses by means of its own weight with the cutting edge (214) on the fiber (205) to be scored.

10. The method as claimed in claim 8, characterized in that, for breaking the scored fiber, means (154, . . . , 157) arranged underneath the slot (162) in the hand-held device (130) are pressed in the transverse direction against the protruding fiber.

11. The method as claimed in claim 8, characterized in that the broken-off portion of the fiber is caught and collected in a fiber container (151) arranged in the hand-held device (130) underneath the slot (162).

12. The method as claimed in claim 8, characterized in that, after the breaking of the scored fiber (205), the end of the fiber (205) protruding from the connector pin (101) is rubbed off and its end face polished in a rubbing-down process and subsequent polishing process, the end face of the connector pin (101) itself being used for guidance.

13. The method as claimed in claim 1, characterized in that an adhesive cartridge (150) with the powdered reaction adhesive, which is accessible from above through an opening and is closed by a rotatable sleeve (161), is arranged on the hand-held device (130), and in that the sleeve (161) is turned into the opening position for the dipping of the exposed fiber (205) into the adhesive and is turned back into the closed position after the drawing out of the fiber (205).

14. A device for carrying out the method as claimed in claim 1, characterized in that the device is formed as a hand-held device (130), in that the hand-held device (130) has at the upper end a receptacle (160) with a heating element (167), which heating element (167) concentrically encloses the connector pin (101) of a connector (100) inserted into the hand-held device (130) from above, in that arranged above the receptacle (160) is an adaptor (173), which releasably holds and fixes the connector (101) inserted into the hand-held device (130), in that arranged underneath the receptacle (160) are actuating means (129, 136, 137, 141, 143, 151), with which the connector pin (101)

is displaced in the axial direction in relation to the fixed connector (101), in that accommodated in the hand-held device (130) are means (132) for storing electrical energy, which can be connected to the heating element (167), and in that control means (140, 146) for controlling the heating-up operation are provided.

15. The device as claimed in claim 14, characterized in that the receptacle (160) is fitted onto the hand-held device (130), with appropriate contact sockets (153) and contact pins (172, 172') being provided for the electrical connection of the heating element (167) and a slot (162) remaining free between the receptacle (160) and the hand-held device (130) for providing access from the outside to the connector pin (101) inserted in the heating element (167).

16. The device as claimed in claim 14, characterized in that the heating element (167) comprises a cylindrical coil of a heating wire (186) wound onto a sleeve (187), and in that the sleeve (187) with the heating wire (186) is arranged in the center of a spring plate (171) in such a way that it is deflected in the direction of the connector axis of the inserted connector (100).

17. The device as claimed in claim 16, characterized in that the spring plate (171) is formed as a printed circuit board and serves for the connection of the heating wire (186), and in that the spring properties of the spring plate (171) are produced by two concentric milled recesses (189, 190) in the printed circuit board, engaging spirally in each other.

18. The device as claimed in claim 14, characterized in that the adaptor (173) is releasably connected to the receptacle (160).

19. The device as claimed in claim 14, characterized in that the adaptor (173) comprises two slides (178, 178'), which, lying opposite each other, are displaceable transversely in relation to the connector axis of the inserted connector (100), in that the inserted connector (100) held in a clamping manner between the two slides (178, 178'), and in that the two slides (178, 178') are arrested in the clamping position by means of an arresting slide (176) which is displaced transversely in relation to them.

20. The device as claimed in claim 14, characterized in that the actuating means comprise a bolt (143) which is displaceably mounted in a guide (141) and acts via an intermediate element (151) guided in the guide (141) on the connector pin (101) of the connector (100) inserted into the receptacle (160).

21. The device as claimed in claim 20, characterized in that the intermediate element is formed as a fiber container (151) for catching the fiber portions broken off after the adhesive bonding, and in that the fiber container (151) is releasably connected to the bolt (143), in particular by means of a built-in magnet (144), and is removed from the guide (141) for emptying.

22. The device as claimed in claim 20, characterized in that the hand-held device (130) comprises a tubular housing (127), which is closed off at the upper end by a disk-shaped body (158), in that a rechargeable battery pack (132) is accommodated in the lower part of the housing (127), in that the guide (141) for the bolt (143) and the intermediate element or the fiber container (151) is arranged between the rechargeable battery pack (132) and the body (158), and in that the bolt (143) is actuated by means of a cup-shaped operating part (129), which has been slipped displaceably over the lower end of the housing (127) against the pressure of a compression spring (131) and is in operative connection with the bolt (143) past the rechargeable battery pack (132) by mechanical connecting means (136, 137, 139).

23. Device as claimed in claim 22, characterized in that, in the housing (127), means (140, 146, 149) for the electronic control of the heating-up operation are arranged between the rechargeable battery pack (132) and the disk-shaped body (158), around the bolt (143).

24. The device as claimed in claim 14, characterized in that means (147, 148, 159, 161) for receiving and safely storing an adhesive cartridge (150) filled with the adhesive are provided on the hand-held device (130).

25. The device as claimed in claim 14, characterized in that a tool box (215) which is worn is provided for storing and keeping ready the hand-held device (130) and the associated tools (208).

26. The device as claimed in claim 25, characterized in that packaging containers (226) with consumable parts, are releasably attached to the tool box (215).

27. A plug-in connector for use in the case of a method as claimed in claim 1, which plug-in connector comprises a connector (100) with a connector pin (101) for receiving the fiber (205) being the central part of a buffered fiber (203) of the optical waveguide (200), characterized in that means (104, 106, 110, 112, 113) for fixing the buffered fiber (203) of the optical waveguide (200) are provided in the connector (100), which fixing means (104, 106, 110, 112, 113) can be actuated by axially pushing the connector pin (101) into the connector (100).

28. The plug-in connector as claimed in claim 27, characterized in that the fixing means comprise an inner part (104) which extends in the axial direction, is provided with a through-bore for leading through the optical waveguide (200) and into which the connector pin (101) is inserted at one end, and which runs out at the other end into a number of clamping arms (111), which surround the buffer fiber (203) of a led-through optical waveguide (200) in an annular manner, in that the inner part (104) extends with the clamping arms (111) into a concentrically arranged sleeve (106), and in that the sleeve (106) has a conical narrowing (110), in which the clamping arms (111) are pressed together in a clamping manner when the inner part (104) is pushed further into the sleeve (106).

29. The plug-in connector as claimed in claim 28, characterized in that latching means (112, 113) which latch the two parts to each other when the inner part (104) is pushed into the sleeve (106) for the clamping of a buffered fiber (203) are provided on the inner part (104) and on the sleeve (106).

30. The plug-in connector as claimed in claim 27, characterized in that a buckling preventer (115) which is attached to the rear end of the connector (100) is provided, in that the connector (110) has a conical external thread (108) for the attachment of the buckling preventer (115) to the rear end, and in that a nut (117) which has a corresponding conical internal thread (118), is screwed with the buckling preventer (115) onto the external thread (108) and holds the buckling preventer (115) on the connector (100) is provided.

31. The plug-in connector as claimed in claim 30, characterized in that the external thread (108) and internal thread (118) are formed as round threads, and in that means, in particular in the form of a tangentially oriented cutting plate (107), which prevent the nut (117) from turning back on the external thread (108) are arranged on the external thread (108).

32. The plug-in connector as claimed in claim 30, characterized in that the nut (117) is arranged releasably in a sleeve part (116) formed onto the buckling preventer (115), and in that, for positive connection with torque limitation between the nut (117) and the buckling preventer (115), a knurling (126 and 125) is respectively provided on the outer circumference of the nut (117) and on the inner circumference of the sleeve part (116), which knurlings (125, 126) are in engagement with each other.

33. The plug-in connector as claimed in claim 30, characterized in that an annular receiving space (109) is provided on the connector (100), behind the external thread (108) in the plugging direction, in that the buckling preventer (115) is displaceable in the axial direction in relation to the nut (117) to the extent that the sleeve part (116) covers over the receiving space (109), and in that run-in slots (119) which seizes reinforcing fibers (202) of the optical waveguide (200) protruding out of the nut (117) and turns them into the receiving space (109) when the buckling preventer (115) is turned are attached to the front end of the sleeve part (116).

34. The plug-in connector as claimed in claim 30, characterized in that a tubular attachment (194) for pushing in the buffered fiber (203) and for pushing the cladding (201) over it is provided on the connector (100), in front of the external thread (108) in the plugging direction, and in that an insertion aid, in particular in the form of an insertion groove (231), is arranged at the open end of the attachment (194).

35. The plug-in connector as claimed in claim 30, characterized in that the buckling preventer (115) has an outwardly conically tapering buckling preventer grommet (124), and in that a marking, in particular in the form of a marking ring (207) of a differing diameter, up to which the buckling preventer grommet (124) must be shortened if an optical waveguide (200) provided with a cladding (201) is to be made up, is provided on the buckling preventer grommet (124).

36. The plug-in connector as claimed in claim 30, characterized in that, to increase the turning force which is applied, two wings (122, 123) are formed on the outer side of the buckling preventer (115), lying opposite each other, and are removed after the screwing-on of the buckling preventer (115) by breaking off at a predetermined breaking point arranged directly on the buckling preventer (115).

* * * * *